Figure 2:
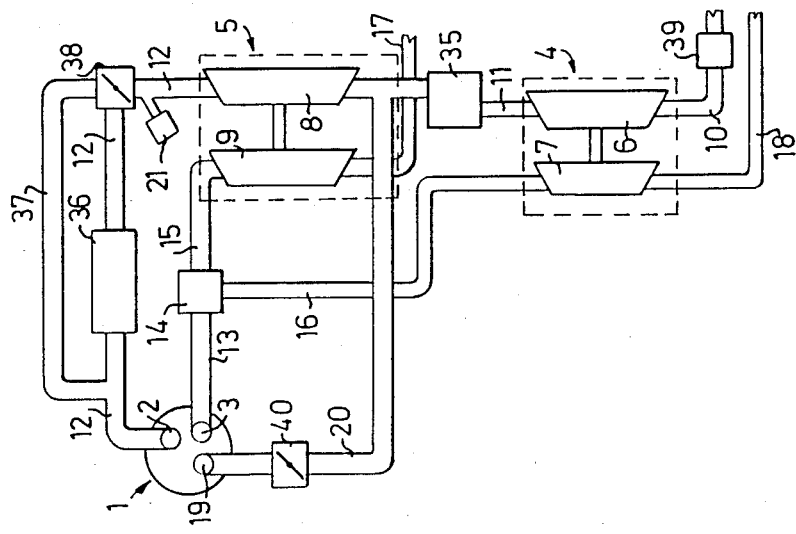

United States Patent [19]

Holmér

[11] Patent Number: 4,852,353
[45] Date of Patent: Aug. 1, 1989

[54] METHOD AND AN ARRANGEMENT FOR CONTROLLING THE WORKING CYCLE OF A TURBOCHARGED INTERNAL COMBUSTION ENGINE

[75] Inventor: Ernst Holmér, Gothenburg, Sweden

[73] Assignee: AB Volvo, Gothenburg, Sweden

[21] Appl. No.: 142,661

[22] Filed: Jan. 11, 1988

[30] Foreign Application Priority Data

Jan. 14, 1987 [SE] Sweden ................ 8700116

[51] Int. Cl.⁴ .............................................. F02B 37/00
[52] U.S. Cl. ...................................... 60/605.1; 60/611; 60/612; 123/316
[58] Field of Search ................... 60/605, 606, 611, 612, 60/599; 123/316, 563, 564

[56] References Cited

U.S. PATENT DOCUMENTS

| | | | |
|---|---|---|---|
| 2,283,175 | 5/1942 | Berger | 123/564 X |
| 2,936,575 | 5/1960 | Lieberherr | 60/611 |
| 4,513,729 | 4/1985 | Udd | 123/563 |

FOREIGN PATENT DOCUMENTS

| | | | |
|---|---|---|---|
| 2818447 | 11/1979 | Fed. Rep. of Germany | 60/612 |
| 119922 | 7/1983 | Japan | 60/606 |
| 12128 | 1/1984 | Japan | 123/316 |

Primary Examiner—Michael Koczo
Attorney, Agent, or Firm—Young & Thompson

[57] ABSTRACT

This invention relates to a method and an arrangement for controlling the working cycle of an internal combustion engine (1) which is supercharged by at least one exhaust-driven turbo-compressor (4,5). Each cylinder of the engine has an inlet valve (2) to which air is supplied from the turbo-compressors (4,5) through an induction or inlet line (12), and an outlet valve (3) from which the exhaust gases are passed through an outlet line (13) to the turbo-compressors (4,5). Each cylinder is also provided with a separate pressure control valve (19) which is connected to the induction system by a pressure control line (20) and which is intended to open when the piston, during the compression stroke, is located in a distance from the bottom-dead-center position (C) of the piston, and is intended to close when the piston, during the compression stroke, is located at a second predetermined position (D) in the cylinder at a greater distance from the bottom-dead-center position (C) of the piston.

11 Claims, 1 Drawing Sheet

METHOD AND AN ARRANGEMENT FOR CONTROLLING THE WORKING CYCLE OF A TURBOCHARGED INTERNAL COMBUSTION ENGINE

The present invention relates to a method for controlling the working cycle of a four-stroke internal combustion engine which is supercharged by means of at least one exhaust-driven turbo-compressor. The invention also relates to an arrangement which is intended for carrying out the method.

Present day internal combustion engines which are supercharged by means of one or more exhaust-driven turbo-compressors are highly reliable and highly efficient. There are, however, several reasons why endeavours should be made to increase the efficiency of such engines. One reason lies in the desirability of reducing the proportion of harmful constituents contained by the exhaust gases, particularly with regard to the emission of harmful particles, hydrocarbons and oxides of nitrogen. One method by means of which this desideratum can be realized is described, for example, in U.S. application Ser. No. 885,708, filed July 15, 1986, now U.S. Pat. No. 4,815,423. In accordance with this known method the exhaust valve of each engine cylinder is opened a second time during each working cycle of the engine, namely during part of the compression stroke. This known method is intended primarily for diesel engines.

It is a well known fact that the emission of particles from Otto engines is low and that the proportion of nitrogen oxides contained by the exhaust gases is also low when such engines are run on a lean fuel-air mixture, i.e. complete combustion can be obtained when the amount of fuel present is smaller than the amount of available air. Hydrocarbons and other combustible components of the exhaust gases, such as carbon monoxide, aldehydes etc, can be eliminated easily by means of an oxidizing catalyst, should this be required.

A pronounced characteristic of Otto engines is that the fuel-air mixture is formed at such an early stage of the process that the mixture is able to homogenize. The efficiency of the Otto engine, however, is lower than the efficiency of the diesel engine, which renders the Otto engine less attractive for use in those areas where the lowest possible fuel consumption is desired, for economic reasons, for instance in trucks, lorries etc. One reason for the comparatively low efficiency of the Otto engine lies in the comparatively low compression ratio employed in such engines. This comparatively low compression ratio is necessary, however, since the otherwise spontaneous ignition, socalled knocking, would occur, resulting in harmful effects, for instance in a reduction in the useful life of the engine. It has been shown, however, for instance by Atkinson, that efficiency is primarily connected with a high expansion ratio. By using solely a part of the compression stroke for compressing the fuel-air mixture and the whole of the working stroke, subsequent to combustion, for expansion purposes it would be possible to achieve the low compression ratio required to avoid knocking, and also the high expansion ratio necessary to obtain a high engine efficiency. This procedure is employed in the method described in U.S. application Ser. No. 885,708, filed July 15, 1986, now U.S. Pat. No. 4,815,423. This method, however, cannot be employed with Otto engines, since it would mean that part of the fuel-air mixture would be released in an uncombusted state through the outlet line or exhaust pipe.

The object of the present invention is to provide a method and an arrangement of the aforesaid kind which will enable the efficiency of an internal combustion engine to be further improved. This object is achieved in accordance with the invention by means of a method and an arrangement having the characterizing features set forth below.

Figure 1:
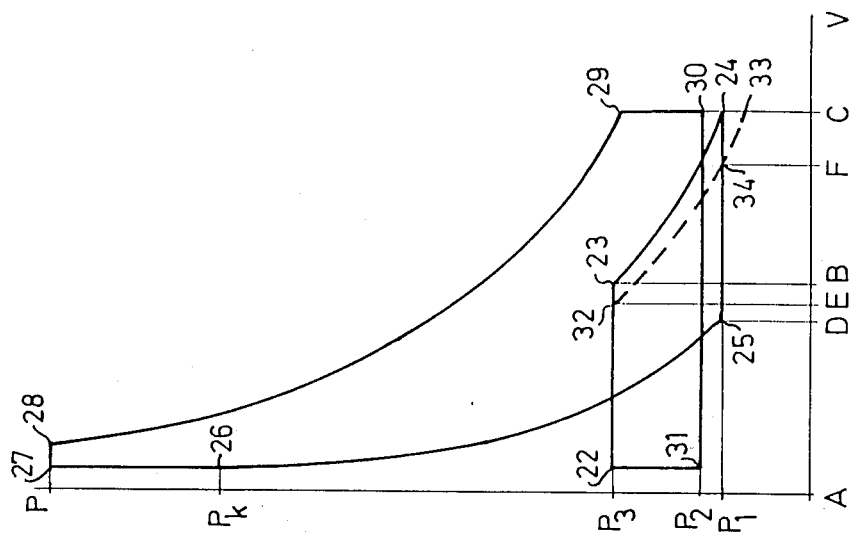

The invention will now be described in more detail with reference to the accompanying drawing, in which FIG. 1 is a schematic PV-diagram for an internal combustion engine in which the inventive method is employed, said diagram illustrating the conditions at full engine load, and FIG. 2 is a schematic view of a cylinder of an internal combustion engine provided with an arrangement according to one embodiment of the invention.

FIG. 1 illustrates the working cycle of a supercharged four-stroke internal combustion engine, said working cycle being controlled in accordance with one embodiment of the invention. The Figure is schematic and is only intended to illustrate the principles of the working cycle, and shows only those conditions that prevail at full engine loads.

FIG. 2 illustrates schematically an internal combustion engine 1 in which the inventive method illustrated in FIG. 1 is employed. Although the illustrated engine 1 has only one cylinder, it will be understood that the invention can be applied to internal combustion engines having any desired number of cylinders. Each cylinder of the engine 1 is provided with a conventional inlet valve 2 and outlet valve 3. The engine 1 is also provided with two exhaust-driven turbo-compressors 4 and 5, the turbo-compressor 4 including a compressor 6 and a turbine 7, whereas the turbo-compressor 5 includes a compressor 8 and a turbine 9.

The turbo-compressors 4 and 5 are coupled to the engine in the following manner. Air is drawn into the compressor 6 by suction through a suction line 10 and, subsequent to compression in the compressor 6, is delivered through a connecting line 11 to the compressor 8, where the air is further compressed and then passed to the engine inlet valve 2, through an inlet or induction line 12. The exhaust gases generated by the combustion of the fuel-air mixture in the engine cylinder are discharged through the outlet valve 3, to an outlet line 13 which is divided into two branch lines 15 and 16 at a branch location 14, of which branch lines the line 15 extends to the turbine 9 of the turbo-compressor 5 and the branch line 16 extends to the turbine 7 of the turbo-compressor 4. The exhaust gases flowing in the branch lines 15 and 16 therewith drive the turbines 9 and 7, respectively, whereafter the exhaust gases flow out through respective blow-out pipes 17 and 18. The exhaust-driven turbines 9 and 7 in turn drive respective compressors 8 and 6. The components described hitherto with regard to the engine 1 correspond to components used in known techniques employed with supercharged internal combustion engines.

In accordance with the invention, each engine cylinder is provided, in addition to the inlet valve 2 and the outlet valve 3, with a pressure control valve 19. Connected to the valve 19 is a pressure control line 20, which in turn is connected to the connecting line or pipe 11 extending between the compressor 6 and the compressor 8. The inlet line 12 incorporates a fuel injection device 21 which is intended to inject fuel into said line 12, such that the inlet line 12 conducts a fuel-air mixture to the inlet valve 2.

The working cycle illustrated in FIG. 1 is effected in the engine 1 illustrated in FIG. 2 in accordance with the inventive method in the following manner: At the beginning of the induction stroke, the piston is located in its top-dead-center position A in the cylinder and the inlet valve 2 is open, wherewith fuel-air mixture at pressure $P_3$ flowing in the inlet line 12 passes through the inlet valve 2 and flows into the cylinder as the piston moves outward from its top-dead-center position A to position B, i.e. from point 22 to point 23 in the diagram illustrated in FIG. 1. When the piston occupies position B, i.e. is located at point 23, the inlet valve 2 closes, and the fuel-air mixture in the cylinder is adiabatically expanded upon further movement of the piston to its bottom-dead-center position C, i.e. movement of the piston from point 23 to point 24 on the diagram.

The pressure control valve 19 opens when the piston reaches its bottom-dead-center position C, i.e. is located at point 24. By suitable selection of the pressure $P_3$ downstream of the second compressor 8, i.e. the pressure in the inlet line 12, and suitable selection of the pressure $P_1$ downstream of the first compressor 6, i.e. the pressure in the connecting line 11, and by suitable selection of the time-point at which the inlet valve 2 closes, i.e. the point 23, it is possible to achieve the system status illustrated in full lines in FIG. 1, namely a status in which the pressure of the fuel-air mixture in the cylinder at point 24 corresponds to the pressure $P_1$. The pressure control valve 19 is then held open during movement of the piston from its bottom-dead-center position C to a piston position D, i.e. up to the point 25 in the diagram. The pressure control valve 19 closes at this point on the diagram, i.e. when the piston occupies position D, whereafter the fuel-air mixture present in the cylinder is compressed during continued movement of the piston to its top-dead-center position A, the line 25-26. The compression pressure $P_k$ is reached when the piston reaches position A, i.e. at point 26 on the diagram.

Subsequent to ignition of the fuel-air mixture and to the subsequent combustion of said mixture in the cylinder at the top-dead-center position A of the piston, the line 26-27-28, expansion takes place during the outward stroke or working stroke of the piston, the line 28-29, during movement of the piston towards its bottom-dead-center position C. The outlet valve 3 opens at point 29, i.e. when the piston has reached its bottom-dead-center position C, and a decrease in pressure is obtained at constant volume, line 29-30, down to the pressure $P_2$ prevailing in the outlet line 13. As the piston moves from its bottom-dead-center position C to its top-dead-center position A during the exhaust stroke of the piston, the exhaust gases are forced from the cylinder, the line 30-31. The outlet valve 3 then closes and the inlet valve 2 opens, giving rise to an increase in pressure, the line 31-32. The working cycle of the engine is then completed and a new working cycle commences.

FIG. 1 illustrates in broken lines how the engine working cycle is changed when the inlet valve 2 is closed at an earlier stage during the induction stroke. For example, if the inlet valve 2 closes when the piston is located in position E, i.e. at point 32, the cycle during the remainder of the induction stroke will follow the broken curve 32-33 up to the bottom-dead-center position C of the piston. When the pressure control valve 19 opens when the piston occupies its bottom-dead-center position C, the pressure is immediately increased to the pressure $P_1$, i.e. up to point 24. Alternatively, the pressure control valve 19 may be held closed until the piston has reached the position F, at which position the pressure has risen to $P_1$, i.e. at point 34, as a result of compression in the cylinder.

The compression ratio in the cylinder can be changed by changing the time at which the pressure control valve 19 closes, i.e. by displacing the point 25 in the diagram, which corresponds to the position D of the piston in the cylinder. This change in the compression ratio can be effected totally without influencing the expansion ratio during the outward stroke or working stroke of the piston. The power output of the engine can be increased by increasing the mass of the fuel-air mixture in the cylinder. This can be achieved in accordance with the invention by closing the pressure control valve 19 at an earlier stage during the compression stroke, i.e. by displacing point 25, which corresponds to the position D of the piston, to the right in the diagram shown in FIG. 1. This displacement of point 25 on the diagram will also result in a higher compression ratio and will increase the risk of knocking, although this risk will decrease at lower temperatures of the fuel-air mixture in the cylinder. When practising the invention, the fuel-air mixture in the cylinder will have a low temperature as a result of the adiabatic expansion which takes place subsequent to closing the inlet valve 2 during the induction stroke, this expansion corresponding to the line 23-24 or 32-34 in the diagram shown in FIG. 1. The fuel-air mixture may also be cooled by means of an intermediate cooler 35 (see FIG. 2), arranged in the connecting line 11 between the compressors 6 and 8, and an aftercooler 36 arranged in the inlet line 12. For the purpose of controlling the cooling effect, a shunt 37 may be arranged to by-pass the aftercooler 36, a distributor valve 38 being provided in the junction between the inlet line 12 and the shunt 37. This lowering of the temperature of the fuel-air mixture in the inlet line 12 will not only reduce the risk of knocking but will also increase the mass of the air, which enables larger quantities of fuel to be combusted, i.e. increases the engine power.

As will be seen from the diagram in FIG. 1, the amount of fuel-air mixture enclosed in the cylinder determines the state at point 25, i.e. the point in time at which the pressure control valve 19 closes and the piston is located in the position D. Since the amount of fuel-air mixture enclosed in the cylinder determines the amount of energy developed, the degree of loading can be readily regulated by changing the pressure $P_1$, i.e. the pressure prevailing downstream of the compressor 6. This pressure can be controlled by providing the turbine 7, which drives the compressor 6, with a variable guide vane, or by means of a control valve 39 placed in the suction line 10 leading to the compressor 6. Alternatively, or in addition thereto, the pressure can be controlled by giving the junction 14 the form of a distributor valve, which for the purpose of controlling said pressure is arranged to pass a greater or smaller amount of exhaust gases through the branch line 16 to the turbine 7. The control valve 39 may also be combined with a fuel injection device, which therewith replaces the fuel injection device 21.

The state when closing the pressure control valve 19 can also be controlled with the aid of a control valve 40 installed in the pressure control line 20 in the proximity of the pressure control valve 19. Closure of the control valve 40, either fully or partially, will cause the gas flow through the pressure control valve 19 and the pressure control line 20 to be throttled to a greater or lesser extent. This means that when the pressure control valve 19 closes, the pressure in the cylinder will increase and that the amount of fuel-air mixture enclosed in the cylinder will also increase.

The invention is not restricted to the aforedescribed embodiment, since modifications can be made within the scope of the following claims.

I claim:

1. A method for controlling the working cycle of an internal combustion engine (1) which is supercharged by means of at least one exhaust-driven turbo-compressor (4, 5) and each cylinder of which having firstly at least one inlet valve (2) to which an induction system is connected, said induction system including the compressor (6, 8) of the or each turbo-compressor (4, 5) and an induction or inlet line (12) for delivering air to the inlet valve (2) from the compressor (6, 8) of the turbo-compressor or of at least one of the turbo-compressors (4, 5), and secondly an outlet valve (3) from which the exhaust gases are passed from the cylinder through an outlet line (13) to the turbine (7, 9) of the turbo-compressor or of at least one of the turbo-compressors (4, 5), characterized by placing each cylinder in communication with the induction system during each engine working cycle by opening and closing the inlet valve (2) during the induction stroke and also through the medium of a separate pressure control valve (19) which is connected to the induction system by means of a pressure control line (20) and which is opened when the piston, during the compression stroke, is located in a first predetermined position (C, F) in the cylinder, in or at a distance from the bottom-dead-center position (C) of the piston, and is closed when the piston, during the compression stroke, is located at a second predetermined position (D) in the cylinder at a greater distance from the bottom-dead-center position (C) of the piston, opening the inlet valve (2) when the piston is located in the vicinity of its top-dead-center position (C) of the piston, opening the inlet valve (2) when the piston is located in the vicinity of its top-dead-center position (A) after the exhaust stroke of the working cycle; and closing the inlet valve (2) during the induction stroke, when the piston is located in a third predetermined position (B) at a distance from the bottom-dead-center position (C) of the piston.

2. A method according to claim 1 and varying the time at which the pressure control valve (19) closes, said time corresponding to the second predetermined position (D) of the piston, thereby to change the compression ratio and the amount of gas enclosed by the cylinder.

3. An arrangement for controlling the working cycle of an internal combustion engine (1) which is supercharged by means of at least one exhaust-driven turbo-compressor (4, 5) and each cylinder of which has firstly at least one inlet valve (2) to which an induction system is connected, said induction system including the compressor (6, 8) of the or each turbo-compressor (4, 5) and an induction or inlet line (12) for delivering air to the inlet valve (2) from the compressor (6, 8) of the turbo-compressor or of at least one of the turbo-compressors (4, 5), and secondly at least one outlet valve (3) from which the exhaust gases are passed from the cylinder through an outlet line (13) to the turbine (7, 9) of the turbo-compressor or of at least one of the turbo-compressors (4, 5), characterized in that each cylinder is provided with a separate pressure control valve (19) which is connected to the induction system by means of a pressure control line (20) and which is intended to open when the piston, during the compression stroke, is located in a first predetermined position (C, F) in the cylinder, in or at a distance from the bottom-dead-center position (C) of the piston, and is intended to close when the piston, during the compression stroke, is located at a second predetermined position (D) in the cylinder at a greater distance from the bottom-dead-center position (C) of the piston, and means for closing the inlet valve (2) during the induction stroke prior to the bottom-dead-center position (C).

4. An arrangement according to claim 3, characterized in that the pressure control line (20) is connected to the induction system upstream of the compressor or of the compressor (8) located nearest the inlet valve (2).

5. An arrangement according to claim 3, characterized in that the induction system incorporates two turbo-compressors (4,5) with their respective compressors (6,8) connected in series and with their respective turbines (7,9) connected in parallel with the outlet line (13).

6. An arrangement according to claim 3, characterized in that an aftercooler (36) is arranged in the inlet line (12).

7. An arrangement according to claim 6, characterized in that a shunt (37) is provided for by-passing the aftercooler (36), and in that the shunt is provided with a control valve (38).

8. An arrangement according to claim 5, characterized in that the outlet line (13) incorporates a control valve (14) for controlling the flow of exhaust gas to at least one of the turbines (7,9).

9. An arrangement according to claim 3, characterized in that a control valve (39) is arranged in the suction line (10) to the compressor or to the compressor located furthest from the inlet valve (2).

10. An arrangement according to claim 3, characterized in that the inlet line (17) incorporates a fuel supply device (21).

11. An arrangement according to claim 3, characterized in that a control valve (40) is arranged in the pressure control line (20) in the proximity of the pressure control valve (19).

* * * * *